United States Patent [19]

Ichikawa

[11] 4,031,458

[45] June 21, 1977

[54] A.C. VOLTAGE REGULATOR EMPLOYING THYRISTOR

[75] Inventor: Kazuo Ichikawa, Minowa, Japan

[73] Assignee: Olympus Optical Co., Ltd., Tokyo, Japan

[22] Filed: Mar. 12, 1976

[21] Appl. No.: 666,335

[30] Foreign Application Priority Data

Mar. 20, 1975 Japan .............................. 50-33725

[52] U.S. Cl. .............................. 323/36; 307/252 B; 307/252 T; 323/22 SC; 323/24
[51] Int. Cl.² .............................................. G05F 1/44
[58] Field of Search ............ 323/22 SC, 24, 34–37; 307/252 B, 252 N, 252 T

[56] References Cited

UNITED STATES PATENTS

| | | | |
|---|---|---|---|
| 3,392,626 | 7/1968 | Miller et al. | 323/36 |
| 3,452,264 | 6/1969 | Turtle | 323/36 |
| 3,493,848 | 2/1970 | Galloway | 323/36 |
| 3,855,665 | 12/1974 | Schwartz | 323/36 |

OTHER PUBLICATIONS

*Electronic Applications*, vol. 28, No. 3, Dec. 10, 1968, "Diac Triggering of Thyristors & Triacs," by J. Rozenboom, pp. 85–94.

Primary Examiner—Gerald Goldberg
Attorney, Agent, or Firm—Ostrolenk, Faber, Gerb & Soffen

[57] ABSTRACT

An a.c. voltage regulator includes a three terminal thyristor connected across an a.c. power source in series with a load. The thyristor is associated with a time constant circuit comprising a variable resistor and a capacitor and which is connected therewith through a trigger pulse generating element, thus providing a phase control over the conduction of the thyristor. A voltage divider is connected across the main terminals of the thyristor, namely, those terminals excluding the gate terminal, and is connected with gate terminal through a capacitor and is also connected with the time constant circuit through the trigger pulse producing element. A constant voltage diode is connected across the time constant circuit.

2 Claims, 4 Drawing Figures

A.C. VOLTAGE REGULATOR EMPLOYING THYRISTOR

BACKGROUND OF THE INVENTION

The invention relates to an a.c. voltage regulator employing a thyristor, and more particularly a phase controlled voltage regulator of the type employing a three terminal thyristor.

A conventional a.c. voltage regulator of the type described is constructed as illustrated in FIG. 1 or FIG. 3 Referring to FIG. 1, connected in series across the opposite terminals 1a, 1b of an a.c. power supply 1 are a load 2 and a three terminal, bilateral thyristor 3. The thyristor 3 is associated with a time constant circuit comprising a series combination of a variable resistor 7 and a capacitor 8. The variable resistor 7 has its one end connected with a second anode terminal 4 of the thyristor 3 while the capacitor 8 has its one end connected with a first anode terminal 5 of the thyristor 3, with the junction 9 between the resistor 7 and the capacitor 8 being connected with a gate terminal 6 of the thyristor 3 through a bilateral diode 10 which serves to produce a trigger pulse. The three terminal, bilateral thyristor 3 may for example, be a TRIAC (trademark of General Electric Company) and the bilateral diode 10 may, for example be a DIAC (trademark of General Electric Company) which is a two terminal, bilateral thyristor.

In the operation of the conventional voltage regulator shown, the thyristor 3 initially remains non-conductive, so that a current flows to charge the capacitor 8 through the resistor 7. As the voltage across the capacitor 8 reaches a breakover voltage of the bilateral diode 10, the latter conducts, applying a trigger pulse, which is synchronized with each one-half cycle of the supply frequency, to the gate terminal 6 of the thyristor 3. Thereupon, a conduction path is established across the anode terminals 4, 5, whereby the current from the supply 1 flows through the load 2 and the thyristor 3. By changing the time constant established by the resistor 7 and the capacitor 8 to vary the phase angle at which a trigger pulse is produced during each one-half cycle of the alternating current, the conduction angle of the thyristor 3 can be controlled, thereby providing a control of the effective a.c. voltage across the load 2.

Another conventional circuit as shown in FIG. 3 comprises a full wave rectifier 18 comprising diodes 18a to 18d and having its input terminals 19a, 19b connected across an a.c. supply 21 in series with a load 22. The full wave rectifier 18 has a pair of output terminals 20a, 20b across which is connected a three terminal, unilateral thyristor 23 which is associated with a time constant circuit comprising a series combination of a variable resistor 27 and a capacitor 28. The resistor 27 has its one end connected with an anode terminal 24 of the thyristor 23 while the capacitor 28 has its one end connected with a cathode terminal 25 of the thyristor 23. The junction 29 between the resistor 27 and the capacitor 28 is connected with a gate terminal 26 of the thyristor 23 through a two terminal, unilateral thyristor 30 which serves to produce a trigger pulse.

The operation of the circuit shown in FIG. 3 is similar to that described previously in connection with FIG. 1. Specifically, initially the capacitor 28 is charged through the load 22 and the variable resistor 27, and as the voltage across the capacitor 28 reaches the breakover voltage of the unilateral thyristor 30, the latter conducts to apply a trigger pulse, as synchronized with each one-half cycle of the supply frequency, to the gate terminal 26 of the thyristor 23. Thereupon a conduction path is established across the anode terminal 24 and the cathode terminal 25 of the thyristor 23, permitting a current flow from the supply 21 through the load 22. By changing the time constant established by the resistor 27 and the capacitor 28 to vary the phase angle at which a trigger pulse is produced during each one-half cycle of the alternating current, the conduction angle of the thyristor 23 can be controlled, thereby providing a control over the effective a.c. voltage across the load 22.

However, the conventional circuits shown in FIGS. 1 and 3 have disadvantages in that, as the supply voltage increases, the changing current to the capacitor 8, 28 increases. This increase in the charging current causes the breakover voltage of the trigger pulse producing element, that is, either diode 10 or unilateral thyristor 30, to be reached earlier in time to increase the conduction angle of the thyristor 3, 23, thereby causing an unintended increase in the effective voltage across the load 2, 22. If the supply voltage decreases, the effective voltage across the load 2, 22 will also decrease. In this manner, a voltage fluctuation of the power supply produces an amplified effect upon the effective voltage across the load. In one experiment, it is found that when a supply voltage of 100V is used and the circuit parameters are chosen to establish an effective voltage across the load 2 to 30V, a fluctuation of ±10% from the nominal voltage of 100V resulted in a variation in the effective voltage across the load 2 which is as high as ±100% from the designed value of 30V.

SUMMARY OF THE INVENTION

It is an object of the invention to provide an a.c. voltage regulator of the type described in which a constant voltage diode and a voltage divider are incorporated into the conventional voltage regulator circuit to minimize the variation in the effective voltage across the load due to change in the supply voltage.

In accordance with the invention, a constant voltage diode is provided to stabilize the terminal voltage of the time constant circuit including the capacitor, and a voltage difference between the voltage across the capacitor and the voltage at the junction of the voltage divider is utilized to operate the trigger pulse producing element. Since only simple components such as constant voltage diode, resistor and capacitor element are added, no complication of the circuit arrangement results and the increase in cost of components is minimal.

DETAILED DESCRIPTION OF PREFERRED EMBODIMENTS

Figure 1:
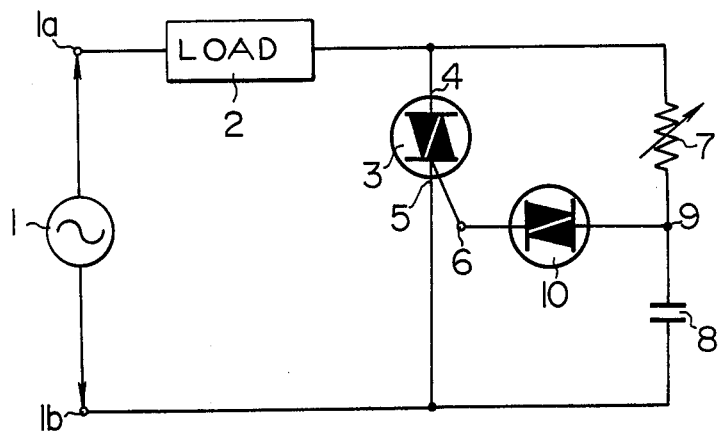
FIG. 1 is a circuit diagram of a conventional a.c. voltage regulator employing a three terminal, bilateral thyristor.
Figure 2:
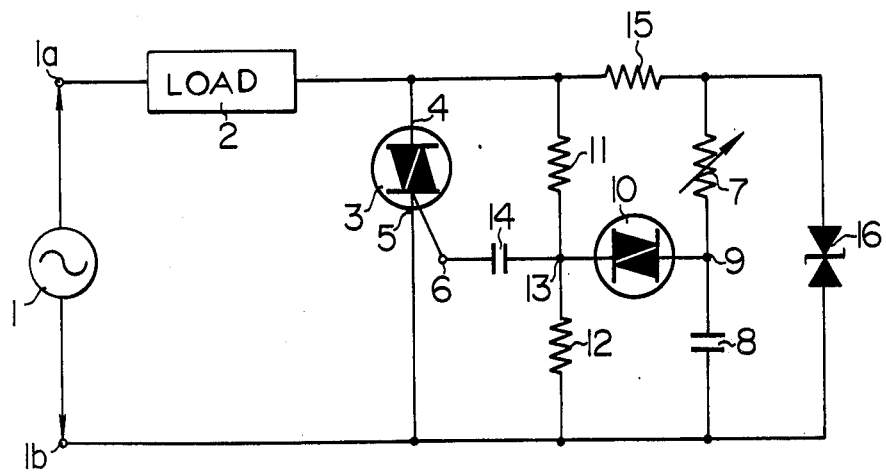
FIG. 2 is a circuit diagram of the a.c. voltage regulator employing a three terminal, bilateral thyristor which is constructed in accordance with one embodiment of the invention.

FIG. 2 shows an embodiment of the invention as applied to a conventional a.c. voltage regulator of the type shown in FIG. 1. In accordance with the invention, a resistive voltage divider including a pair of series connected resistors 11, 12 is connected in shunt with the thyristor 3, and a series combination of a resistor 15 and a bilateral constant voltage zener diode 16 is connected across the voltage divider, with the junction between the resistor 15 and the diode 16 being connected with one end of the time constant circuit i.e. resistor 7. In addition, a capacitor 14 is connected between the gate terminal 6 of the thyristor 3 and the junction 13 between the resistors 11, 12 of the voltage divider. The bilateral diode 10 is connected between the junctions 9 and 13. The Zener voltage or threshold voltage of the bilateral constant voltage diode 16, the breakover voltage of the diode 10 and the values of resistors 7, 11, and 12 and the capacitor 8 are chosen such that as a voltage fluctuation of the power supply 1 occurs, the charging rate of the capacitor 8 remains unchanged even though the voltage across the resistor 12 varies at the same rate as the voltage fluctuation. As a consequence, the time required for the bilateral diode 10 to reach its breakover voltage increases as the supply voltage rises since the voltage across the resistor 12 increases. Conversely, when the supply voltage decreases, such time also decreases. In other words, the conduction angle or a conduction period of the thyristor 3 reduces to reduce the effective voltage across the load 2 as the supply voltage increases, and increases to increase the effective voltage across the load 2 as the supply voltage decreases. The net effect is a reduced variation in the effective voltage across the load 2 upon occurrence of a voltage flucation in the power supply.

In one experiment, a supply voltage of 100V is used and the circuit parameters are chosen to establish an effective voltage across the load 2 of 30V. When the supply voltage varied ±10% from the nominal value of 100V, the resulting variation in the effective voltage across the load 2 remained within ±5% from the desired constant value of 30V. It is also possible to completely eliminate a variation in the effective voltage across the load 2 from a selected value by a suitable choice of the resistance of the resistors 11 and 12.

Figure 3:
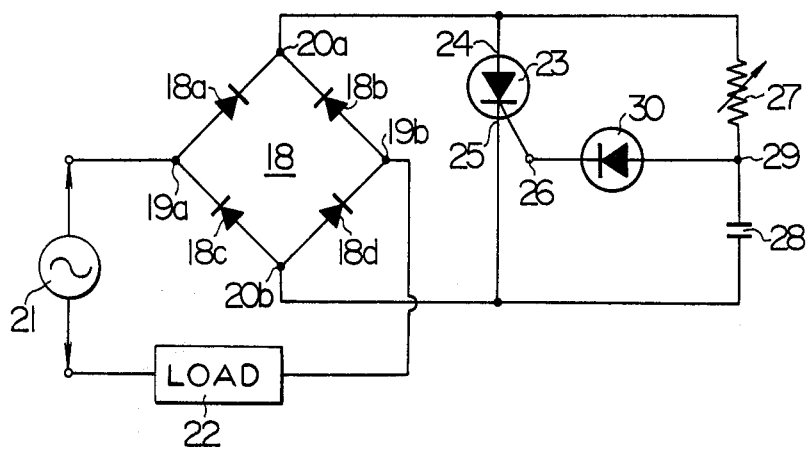
FIG. 3 is a circuit diagram of a conventional a.c. voltage regulator employing a three terminal, unilateral thyristor.
Figure 4:
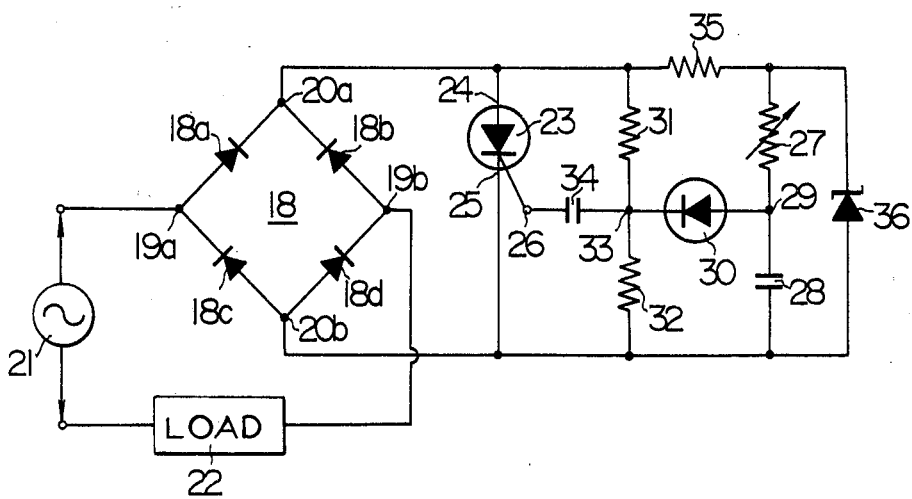
FIG. 4 is a circuit diagram of another embodiment of the invention as applied to the circuit arrangement shown in FIG. 3.

FIG. 4 shows another embodiment of the invention as applied to the conventional a.c. voltage regulator of the type shown in FIG. 3. In accordance with the invention, a resistive voltage divider including series connected resistors 31, 32 is connected in shunt with the thyristor 23, and a series combination of a resistor 35 and a bilateral constant voltage diode 36 is connected across the voltage divider. In addition, a capacitor 34 is connected between the gate terminal 26 of the thyristor 23 and the junction 33 between the resistors 31, 32 of the voltage divider, and the unilateral thyristor 30 is connected between the junctions 33 and 29. The junction between the resistor 35 and the diode 36 is connected with one end of the time constant circuit.

The operation of the circuit shown in FIG. 4 is similar to that described in connection with FIG. 3. Specifically, the time required for the breakover voltage of the thyristor 30 to be reached increases as the supply voltage rises since the voltage across the resistor 32 increases also. Conversely, when the supply voltage decreases, such time also decreases. As a result, the conduction angle of the thyristor is controlled to minimize a variation in the effective voltage across the load 22.

What is claimed is:

1. A phase controlled a.c. voltage regulator for regulating the voltage applied to a load connected in series with an a.c. source, said voltage regulator comprising:
   a bilateral thyristor having first and second anodes and a gate, said first and second anodes being connected to first and second terminals across which a load and an a.c. source may be connected;
   a voltage divider comprising first and second resistive elements connected in series across said first and second terminals;
   a timing circuit including a thrid resistive element, a variable resistor, and a capacitor connected in series across said first and second terminals and a bilateral constant voltage diode connected across said variable resistor and said capacitor to insure that the rate of charge of said capacitor is not affected by minor fluctuations in the magnitude of the voltage generated by said a.c. source;
   a bilateral diode connected between the junction between said capacitor and said variable resistor and the junction between said first and second resistive elements;
   a capacitor coupled between the junction between said first and second resistive elements and said gate whereby the conductive period of said thyristor increases or decreases as an inverse function of an increasing or decreasing power supply voltage so as to apply a substantially constant effective voltage to said load.

2. A phase controlled a.c. voltage regulator for regulating the voltage applied to a load connected in series with an a.c. source, said voltage regulator comprising:
   a unilateral thyristor having an anode, a cathode, and a gate;
   a full wave bridge rectifier having a pair of input and a pair of output terminals, said series connected load and a.c. source being connected to said input terminals, said anode and cathode being connected to said pair of output terminals;
   a voltage divider comprising first and second resistive elements connected in series across said anode and cathode;
   a timing circuit including a third resistive element, a variable resistor, and a capacitor connected in series across said anode and cathode and a constant voltage diode connected across said capacitor and variable resistor to insure that the rate of charge of said capacitor is not effected by minor fluctuations in the magnitude of the voltage generated by said a.c. source;
   a two terminal, unilateral thyristor connected between the junction between said capacitor and said variable resistor and the junction between said first and second resistive elements;
   a capacitor coupled between the junction between said first and second resistive elements and said gate whereby the conduction period of said thyristor increases or decreases as an inverse function of the increasing or decreasing power supply voltage to apply a substantially constant effective voltage to said load.

* * * * *